United States Patent
Lee et al.

(10) Patent No.: US 10,397,974 B2
(45) Date of Patent: Aug. 27, 2019

(54) ELECTRONIC DEVICE AND COMMUNICATION METHOD OF ELECTRONIC DEVICE

(71) Applicant: Samsung Electronics Co., Ltd., Gyeonggi-do (KR)

(72) Inventors: Jong-Phil Lee, Daegu (KR); Jung-Hwan Kim, Gyeongsangbuk-do (KR); Kang-Je Noh, Daegu (KR); Jong-Jin Bae, Gyeongsangbuk-do (KR); Yong-Gil Han, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 78 days.

(21) Appl. No.: 15/193,894

(22) Filed: Jun. 27, 2016

(65) Prior Publication Data

US 2016/0381729 A1 Dec. 29, 2016

(30) Foreign Application Priority Data

Jun. 26, 2015 (KR) .......................... 10-2015-0091544

(51) Int. Cl.
*H04L 12/26* (2006.01)
*H04W 76/18* (2018.01)

(52) U.S. Cl.
CPC .................. *H04W 76/18* (2018.02)

(58) Field of Classification Search
CPC ...... H04L 45/24; H04L 47/35; H04L 47/2441
See application file for complete search history.

(56) References Cited

U.S. PATENT DOCUMENTS

| | | | | |
|---|---|---|---|---|
| 2004/0224709 A1* | 11/2004 | Yi | ........................ | H04W 76/18 455/515 |
| 2011/0199898 A1* | 8/2011 | Cho | ...................... | H04W 48/06 370/230 |
| 2011/0216732 A1* | 9/2011 | Maeda | .................... | H04W 4/08 370/329 |
| 2012/0094707 A1* | 4/2012 | Chen | .................... | H04W 76/18 455/517 |
| 2013/0139153 A1 | 5/2013 | Shah | | |
| 2013/0301420 A1* | 11/2013 | Zhang | .................... | H04W 4/90 370/241 |

(Continued)

FOREIGN PATENT DOCUMENTS

KR 1020150000504 1/2015

*Primary Examiner* — Lakeram Jangbahadur
(74) *Attorney, Agent, or Firm* — The Farrell Law Firm, P.C.

(57) ABSTRACT

Disclosed is a communication method that prevents excess message transmission and improves the efficiency of a communication system. The method includes transmitting a first connection request message for a service connection to a network by an electronic device, receiving a first connection reject message for the first connection request from the network, abstaining from retransmission of the connection request to the network based on the first connection reject message, determining whether an operation configured in the electronic device belongs to a condition set by the electronic device based on at least a portion of the abstinence operation, and when determining that the operation belongs to the condition, transmitting a second connection request message to the network.

14 Claims, 13 Drawing Sheets

(56) References Cited

U.S. PATENT DOCUMENTS

2014/0313889 A1* 10/2014 Jeong .................... H04W 76/19
370/230
2015/0049670 A1 2/2015 Schmid et al.
2016/0278096 A1* 9/2016 Watfa ................ H04W 28/0205

* cited by examiner

ELECTRONIC DEVICE AND COMMUNICATION METHOD OF ELECTRONIC DEVICE

PRIORITY

This application claims priority under 35 U.S.C. § 119(a) to a Korean patent application filed in the Korean Intellectual Property Office on Jun. 26, 2015 and assigned Serial No. 10-2015-0091544, the contents of which are incorporated herein by reference.

BACKGROUND

1. Field of the Disclosure

The present disclosure relates generally to communication methods and devices, and more particularly, to wireless communication methods and devices for connection with a communication network using an electronic device.

2. Description of the Related Art

Wireless communication systems of electronic devices (e.g., smartphones) are advancing to wireless communication systems providing high-speed and high-quality packet data services such as specified in communication standards including 3rd generation partnership project (3GPP) high speed packet access (HSPA), long term evolution (LTE), 3GPP2 high rate packet data (HRPD), and ultra mobile broadband (UMB).

As wireless communication systems evolve, electronic devices (e.g., portable terminals, tablet computers, wearable devices, personal computers or other user devices) supporting wireless communication have evolved to include a plurality of communication parts (e.g., modems or antennas) respectively corresponding to a plurality of communication networks to communicate in the plurality of communication networks.

The development of wireless communication systems permits service providing networks to provide Internet protocol (IP)-based multimedia services (e.g., voices, videos, or data) to electronic device through wireless communication systems. For example, an electronic device supporting wireless communication receives voice, video, or other media services through an IP multimedia subsystem (IMS).

In the conventional art, however, when a subscriber identification module (SIM) card not subscribing to an IMS service is inserted into an electronic device supporting the IMS service among electronic devices, the electronic device attempts a public data network (PDN) connection via the IMS access point name (APN) embedded in the electronic device. Since the subscriber identification information included in the SIM card is not registered in the IMS service, the network transmits a connection reject message corresponding to the connection attempt, and proceeds to register a SIM card capable of providing the IMS service for the SIM card of the electronic device of the connection request. When receiving the reject message, the electronic device continues to request connection, and the network continues to send rejection messages for the connection re-request to the electronic device, which overburdens the communication system.

As such, there is a need in the art for a method and apparatus that prevents such excess message transmission, thereby improving the efficiency of the communication system.

SUMMARY

The present disclosure has been made to address at least the above-mentioned problems and/or disadvantages and to provide at least the advantages described below.

Accordingly, an aspect of the present disclosure is to provide a method and apparatus that controls and limits the attempt to send a request for connection from an electronic device supporting an IMS service to the network, thereby preventing unnecessary power consumption and overburdening of the network.

According to an aspect of an embodiment of the present disclosure, a method for performing communication by an electronic device includes transmitting, by the electronic device, a first connection request message for a service connection to a network, receiving, from the network, a first connection reject message for the first connection request, abstaining, by the electronic device, from retransmission of the connection request to the network based on the first connection reject message, determining, by the electronic device, whether an operation configured in the electronic device belongs to a condition set by the electronic device based on at least a portion of the abstinence operation, and transmitting, when determining that the operation belongs to the condition, a second connection request message to the network.

According to another aspect of an embodiment of the present disclosure, an electronic device includes a communication module that transmits a first connection request message for a service connection to a network and receives a first connection reject message for the first connection request from the network, and a processor that abstains from retransmission of the connection request to the network based on the first connection reject message, determines whether an operation configured in the electronic device belongs to a condition set by the electronic device based on at least a portion of the abstinence operation, and when the operation configured in the electronic device belongs to the condition, controls the communication module to transmit a second connection request message to the network.

According to another aspect of an embodiment of the present disclosure, a method for performing communication by a terminal device supporting a timer that is different from another timer supported by a network, includes transmitting a first connection request message for a service connection to the network by an electronic device, receiving a first connection reject message for the first connection request from the network, and abstaining from retransmission of the connection request to the network based on the first connection reject message

BRIEF DESCRIPTION OF THE DRAWINGS

The above and other aspects, features and advantages of the present disclosure will become more apparent by reference to the following detailed description when considered in connection with the accompanying drawings, in which.

DETAILED DESCRIPTION OF EMBODIMENTS OF THE DISCLOSURE

Figure 1:
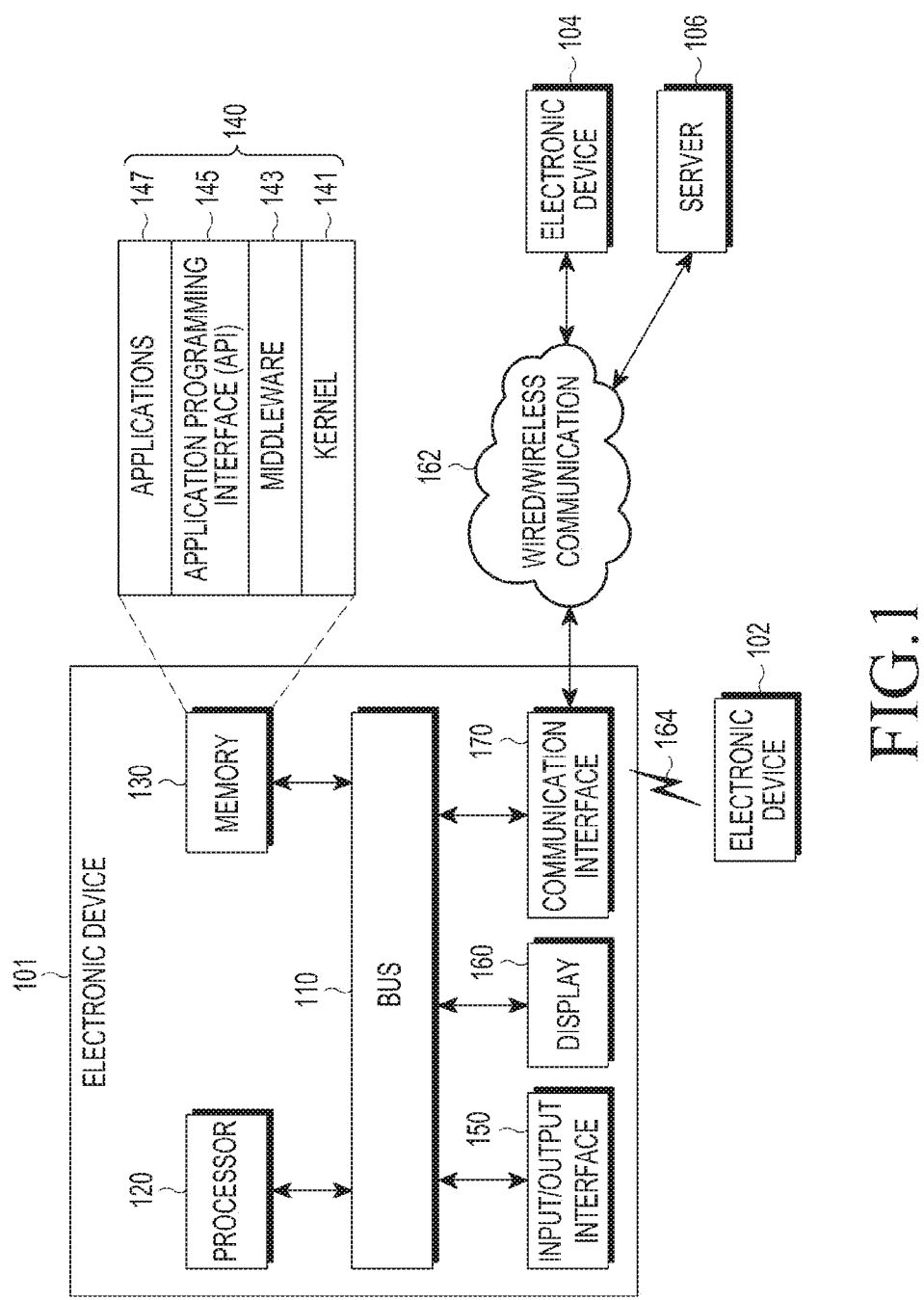
FIG. 1 illustrates a network environment including an electronic device according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings. Detailed descriptions of known functions and/or configurations will be omitted for the sake of clarity and conciseness.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" include all possible combinations of A and B. For example, "A or B," "at least one of A and B," "at least one of A or B" may indicate all of (1) including at least one A, (2) including at least one B, and (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices, and a first component may be referred to as a second component, and vice versa without departing from the scope of the present disclosure.

It will be understood that when an element, such as a first element, is referred to as being operatively or communicatively "coupled with/to," or "connected with/to" another element, such as a second element, it can be directly coupled or connected with/to the second element or via a third element. In contrast, it will be understood that when a first element is referred to as being "directly coupled with/to" or "directly connected with/to" a second element, no third element intervenes between the first and second elements.

As used herein, the terms "configured (or set) to" may be interchangeably used with the terms "suitable for," "having the capacity to," "designed to," "adapted to," "made to," or "capable of" depending on circumstances. The phrase "configured (or set) to" does not essentially indicate "specifically designed in hardware to." Rather, the phrase "configured to" may indicate that a device can perform an operation together with another device or parts. For example, the phrase "processor configured (or set) to perform A, B, and C" may indicate a generic-purpose processor (e.g., a central processing unit (CPU) or application processor) that performs the operations by executing one or more software programs stored in a memory device or a dedicated processor (e.g., an embedded processor) for performing the operations.

The terms as used herein are provided merely to describe some embodiments thereof, but are not intended to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a motion pictures experts group layer audio 3(MP3) player, a mobile medical device, a camera, or a wearable device. The wearable device includes at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

The electronic device may be a home appliance. For example, examples of the smart home appliance include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things (IoT) devices (e.g., a light bulb, various sensors, an electric or gas meter, a sprinkler, a fire alarm, a thermostat, a street light, a toaster, fitness equipment, a hot water tank, a heater, or a boiler).

According to embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). The electronic device may be one or a combination of the above-listed devices, and may be flexible. The electronic device disclosed herein is not limited to the above-listed devices, and includes new electronic devices depending on the development of new technology.

Hereinafter, electronic devices are described with reference to the accompanying drawings, according to embodiments of the present disclosure. As used herein, the term "user" may denote a human or another device (e.g., an artificial intelligence electronic device) using the electronic device.

FIG. 1 illustrates a network environment including an electronic device according to an embodiment of the present disclosure.

Referring to FIG. 1, \an electronic device 101 is included in a network environment 100. The electronic device 101 includes a bus 110, a processor 120, a memory 130, an input/output interface 150, a display 160, and a communication interface 170. In some embodiments, the electronic device 101 may exclude at least one of the components or may add another component.

The bus 110 includes a circuit for connecting the components 110 to 170 with one another and transferring communications (e.g., control messages and/or data) between the components.

The processing module 120 includes one or more of a central processing unit (CPU), an application processor (AP), or a communication processor (CP). The processor 120 performs control on at least one of the other components of the electronic device 101, and/or perform an operation or data processing relating to communication.

The memory 130 includes a volatile and/or non-volatile memory. For example, the memory 130 stores commands or data related to at least one other component of the electronic device 101. The memory 130 stores software and/or a program 140. The program 140 includes, e.g., a kernel 141, middleware 143, an application programming interface (API) 145, and/or applications 147. At least a portion of the kernel 141, middleware 143, or API 145 may be referred to as an operating system (OS).

As used herein, the term "applications" may be referred to as "apps" as well.

For example, the kernel 141 controls or manages system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141, for example.

The middleware 143 may process one or more task requests received from the application program 147 in order of priority. For example, the middleware 143 assigns at least one of application programs 147 with priority of using system resources (e.g., the bus 110, processor 120, or memory 130) of at least one electronic device 101, and performs scheduling or load balancing on the one or more task requests by processing the one or more task requests according to the priority assigned to the at least one application program 147.

The API 145 allows the applications 147 to control functions provided from the kernel 141 or the middleware 143. For example, the API 133 includes at least one interface or function (e.g., a command) for filing control, window control, image processing or text control.

The input/output interface 150 may serve as an interface that may, e.g., transfer commands or data input from a user or other external devices to other component(s) of the electronic device 101. The input/output interface 150 may output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 displays, e.g., various contents (e.g., text, images, videos, icons, or symbols) to the user. The display 160 includes a touchscreen and receives, e.g., a touch, gesture, proximity or hovering input using an electronic pen or a body portion of the user.

The display 160 may be interchangeably used with a touchscreen.

For example, the communication interface 170 enables communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication includes, e.g., short-range communication 164 such as wireless fidelity (Wi-Fi), Bluetooth™, near-field communication (NFC), or global navigation satellite system (GNSS) such as global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" are interchangeably used and wired connection includes at least one of, e.g., universal serial bus (USB), high definition multimedia interface (HDMI), recommended standard (RS)-232, or plain old telephone service (POTS). The network 162 includes at least one of telecommunication networks, e.g., a computer network such as local area network (LAN) or wide area network (WAN), Internet, or a telephone network.

The first and second external electronic devices 102 and 104 each may be a device of the same or a different type from the electronic device 101. The server 106 includes a group of one or more servers. According to an embodiment of the present disclosure, all or some of operations executed on the electronic device 101 may be executed on another or multiple other electronic devices 102 and 104 or server 106.

When the electronic device 101 should perform some function or service automatically or at a request, the electronic device 101, instead of executing the function or service on its own or additionally, may request another device 102 or 104 or server 106 to perform at least some functions associated therewith. The other electronic device may execute the requested functions or additional functions and transfer a result of the execution to the electronic device 101. The electronic device 101 provides a requested function or service by processing the received result as it is or additionally. To that end, a cloud computing, distributed computing, or client-server computing technique may be used, for example.

Figure 2:
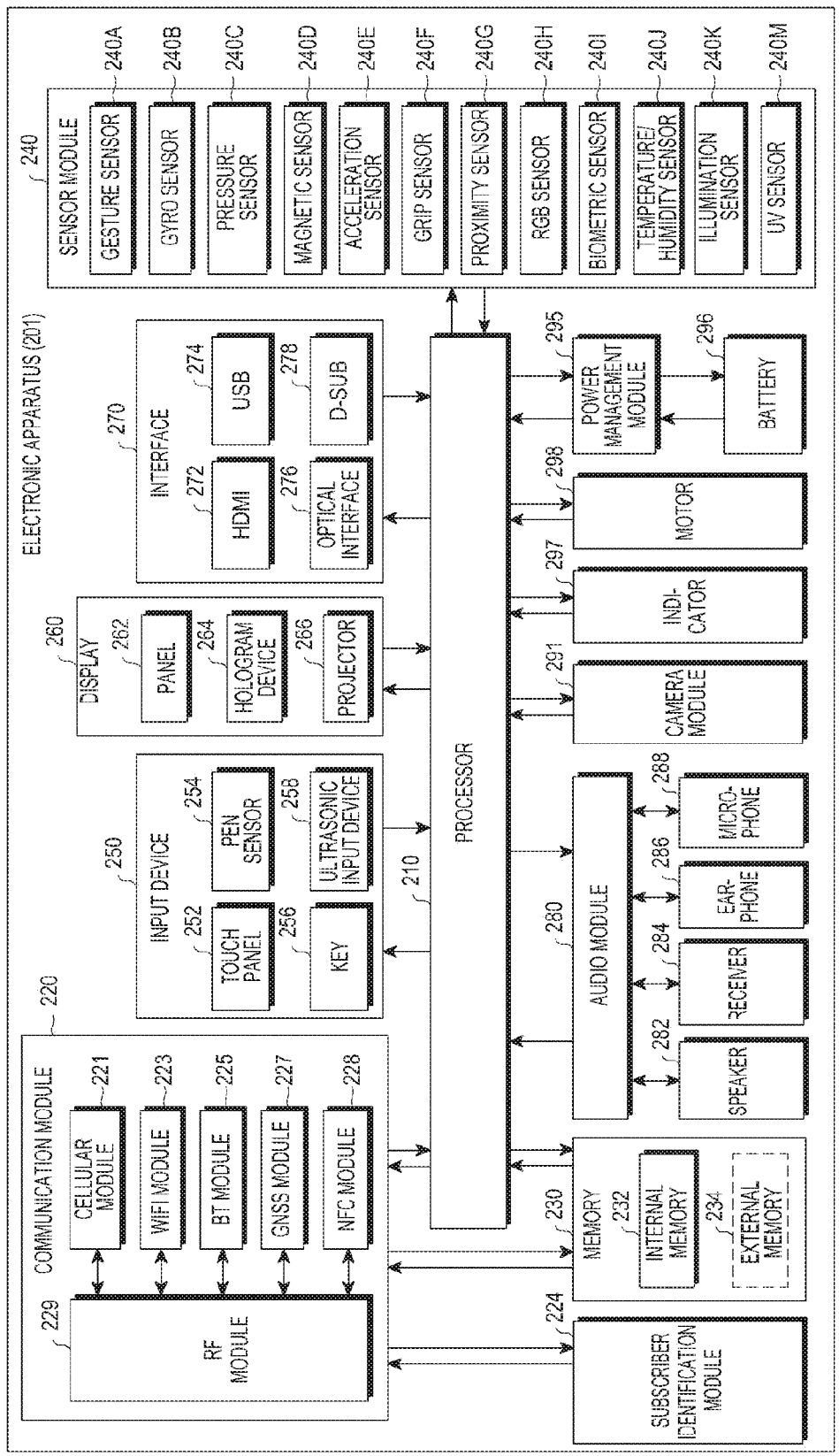
FIG. 2 is a hardware block diagram illustrating an electronic device according to an embodiment of the present disclosure.

FIG. 2 is a hardware block diagram illustrating an electronic device according to an embodiment of the present disclosure.

The electronic device 201 includes all or part of the configuration of, e.g., the electronic device 101 shown in FIG. 1. The electronic device 201 includes one or more application processors (APs) 210, a communication module 220, a SIM card 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware and software components connected to the processor 210 by running, e.g., an operating system or application programs, processes and computes various data, and may be implemented in, e.g., a system on chip (SoC). The processor 210 may further include a graphic processing unit (GPU) and/or an image signal processor. The processor 210 includes at least some (e.g., a cellular module 221) of the components shown in FIG. 2. The processor 210 loads a command or data received from at least one of other components (e.g., a non-volatile memory) on a volatile memory, process the command or data, and stores various data in the non-volatile memory.

The communication module 220 may have the same or similar configuration to the communication interface 170 of FIG. 1. The communication module 220 includes, e.g., the cellular module 221, a Wi-Fi module 223, a Bluetooth™ module 225, a GNSS module 227 (e.g., a GPS module, a Glonass module, a Beidou module, or a Galileo module), a near field communication (NFC) module 228, and a radio frequency (RF) module 229.

The cellular module 221 provides voice call, video call, text, or Internet services through, e.g., a communication network. The cellular module 221 performs identification or authentication on the electronic device 201 in the communication network using the SIM card 224. The cellular module 221 performs at least some of the functions providable by the processor 210. The cellular module 221 includes a communication processor (CP).

The Wi-Fi module 223, the Bluetooth module 225, the GNSS module 227, or the NFC module 228 includes a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 includes, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The SIM card 224 includes a card including a SIM and/or an embedded SIM, and may contain unique identification information (e.g., an integrated circuit card identifier (IC-CID) or subscriber information (e.g., an international mobile subscriber identity (MD)).

The memory 230 (e.g., the memory 130) includes, e.g., an internal memory 232 or an external memory 234. The internal memory 232 includes at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 includes a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 includes at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include an E-nose sensor, an electromyography (EMG) sensor, an electroencephalogram (EEG) sensor, an electrocardiogram (ECG) sensor, an infrared (IR) sensor, an iris sensor, or a finger print sensor.

The sensor module 240 further includes a control circuit for controlling at least one or more of the sensors included in the sensing module. The electronic device 201 may further include a processor configured to control the sensor module 240 as part of the processor 210 or separately from the processor 210, and the electronic device 201 controls the sensor module 240 while the processor 210 is in a sleep mode.

The input unit 250 includes, e.g., a touch panel 252, a (digital) pen sensor 254, a key 256, or an ultrasonic input device 258. The touch panel 252 may use at least one of capacitive, resistive, infrared, or ultrasonic methods. The touch panel 252 includes a control circuit and a tactile layer, and provides a user with a tactile reaction.

The (digital) pen sensor 254 includes, e.g., a part of a touch panel or a separate sheet for recognition. The key 256 includes e.g., a physical button, optical key or key pad. The ultrasonic input device 258 may sense an ultrasonic wave generated from an input tool through a microphone 288 to identify data corresponding to the sensed ultrasonic wave.

The display 260 includes a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 displays an image by projecting light onto a screen. The screen may be, for example, located inside or outside of the electronic device 201. In accordance with an embodiment, the display 260 further includes a control circuit to control the panel 262, the hologram device 264, or the projector 266.

The display 260 including the panel 262 may be used in the same or similar meaning to the term "touchscreen." That is, the touchscreen may be defined to include, in its meaning, the display 260 displaying particular information and the panel 262 capable of receiving touch inputs.

The interface 270 includes e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 includes a mobile high-definition link (MHL) interface, a secure digital (SD) card/multimedia card (MMC) interface, or IrDA standard interface.

The audio module 280 may convert a sound into an electric signal or vice versa, for example. At least a part of the audio module 280 may be included in e.g., the input/output interface 145 as shown in FIG. 1. The audio module 280 processes sound information input or output through a speaker 282, a receiver 284, an earphone 286, or the microphone 288.

For example, the camera module 291 captures still images and videos, and includes one or more image sensors (e.g., front and back sensors), a lens, an image signal processor (ISP), or a flash such as an LED or xenon lamp.

The power manager module 295 manages power of the electronic device 201, and includes a power management Integrated circuit (PMIC), a charger IC, and/or a battery gauge. The PMIC may have a wired and/or wireless recharging scheme. The wireless charging scheme includes e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 includes, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. A processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device includes one or more parts, and a name of the part may vary with a type of the electronic device. The electronic device in accordance with embodiments of the present disclosure includes at least one of the aforementioned components, omits some of the components, or includes other additional component(s). Some of the components may be combined into an entity, but the entity performs the same functions as the components may do.

Figure 3:
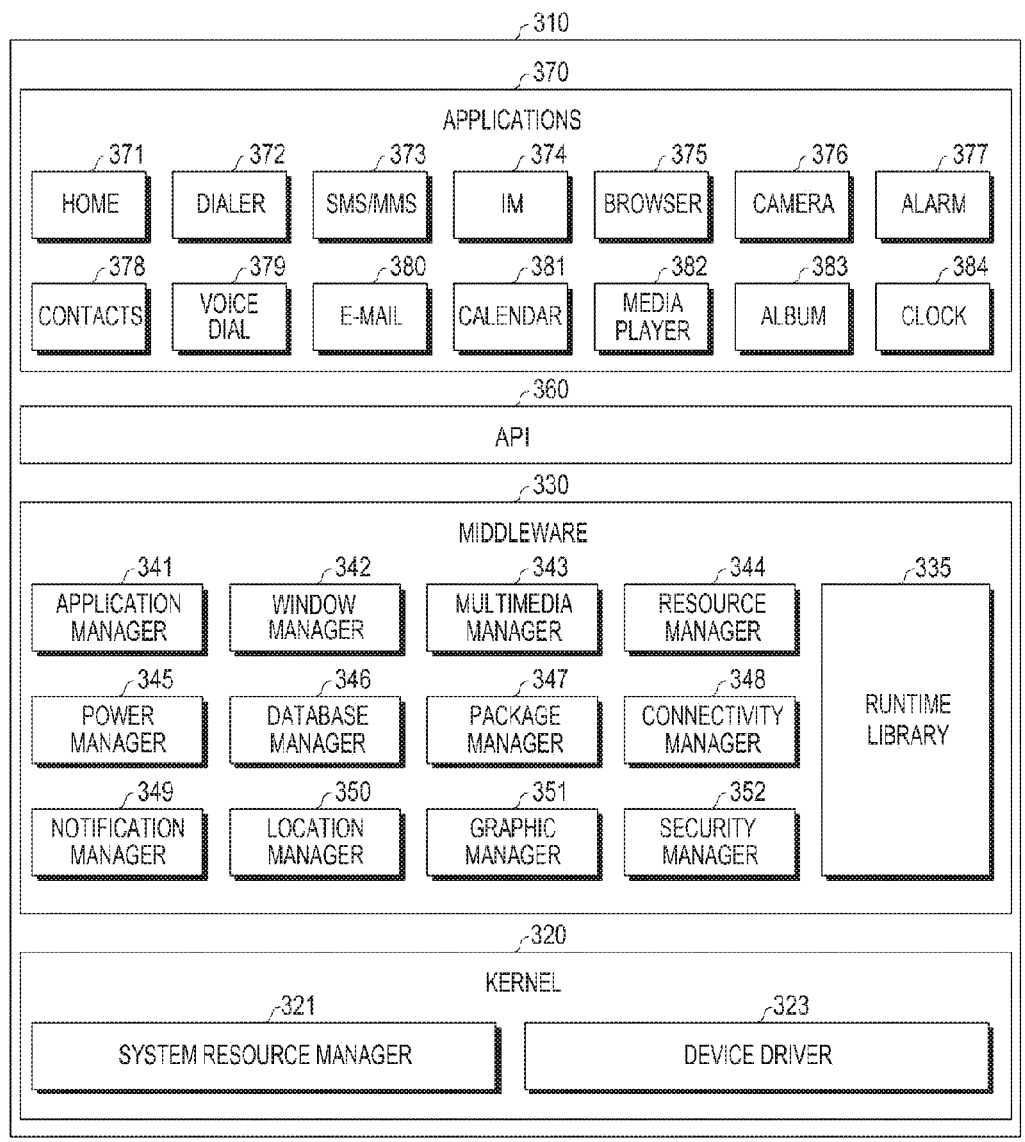
FIG. 3 is a block diagram illustrating a program module according to an embodiment of the present disclosure.

FIG. 3 is a block diagram illustrating a program module according to an embodiment of the present disclosure.

The program module 310 (e.g., the program 140) includes an operating system (OS) controlling resources related to the electronic device (e.g., the electronic device 101) and/or various applications (e.g., the application processor 147) driven on the operating system. The operating system includes, e.g., Android, iOS, Windows, Symbian, Tizen, or Bada.

The program 310 includes, e.g., a kernel 320, middleware 330, an application programming interface (API) 360, and/or at least one of the applications 370. At least a part of the program module 310 may be preloaded on the electronic device or may be downloaded from an external electronic device (e.g., the electronic devices 102 and 104 or server 106).

The kernel 320 (e.g., the kernel 141) includes, e.g., a system resource manager 321 and/or a device driver 323. The system resource manager 321 performs control, allocation, or recovery of system resources and includes a process managing unit, a memory managing unit, or a file system managing unit. The device driver 323 includes, e.g., a display driver, a camera driver, a Bluetooth driver, a shared memory driver, a USB driver, a keypad driver, a Wi-Fi driver, an audio driver, or an inter-process communication (IPC) driver.

The middleware 330 provides various functions to the applications 370 through the API 360 so that the applications 370 may efficiently use limited system resources in the electronic device or provide functions jointly required by applications 370. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 includes a library module used by a compiler in order to add a new function through a programming language while, e.g., at least one of the applications 370 is being executed. The runtime library 335 performs input/output management, memory management, or operation on arithmetic functions.

The application manager 341 manages the life cycle of at least one application of, e.g., the applications 370. The window manager 342 manages GUI resources used on the screen. The multimedia manager 343 may grasp formats necessary to play various media files and use a codec appropriate for a format to perform encoding or decoding on media files. The resource manager 344 manages resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 manages installation or update of an application that is distributed in the form of a package file.

The connectivity manager 348 manages wireless connectivity, such as, e.g., Wi-Fi or Bluetooth. The notification manager 349 displays or notifies an event, such as a coming message, appointment, or proximity notification, of the user without interfering with the user. The location manager 350 manages locational information on the electronic device. The graphic manager 351 manages graphic effects to be offered to the user and their related user interface. The security manager 352 provides various security functions necessary for system security or user authentication. According to an embodiment of the present disclosure, when the electronic device 101 has telephony capability, the middleware 330 may further include a telephony manager for managing voice call or video call functions of the electronic device.

The middleware 330 includes a middleware module forming a combination of various functions of the above-described components. The middleware 330 may be provided a specified module per type of the operating system in order to provide a differentiated function. The middleware 330 may dynamically omit some existing components or add new components.

The API 360 may be a set of, e.g., API programming functions and may have different configurations depending on operating systems. For example, in the case of Android or iOS, one API set may be provided per platform, and in the case of Tizen, two or more API sets may be offered per platform.

The applications 370 include one or more applications that provide functions such as, e.g., a home 371, a dialer 372, a short message service (SMS)/multimedia messaging service (MMS) 373, an instant message (IM) 374, a browser 375, a camera 376, an alarm 377, a contacts 378, a voice dial 379, an email 380, a calendar 381, a media player 382, an album 383, and a clock 384 application, and may further include a health-care (e.g., measuring the degree of workout or blood sugar), or provision of environmental information (e.g., provision of air pressure, moisture, or temperature information) application.

The applications 370 include an information exchanging application supporting information exchange between the electronic device (e.g., the electronic device 101) and an external electronic device (e.g., the electronic devices 102 and 104). Examples of the information exchange application include, but are not limited to, a notification relay application for transferring specific information to the external electronic device, or a device management application for managing the external electronic device.

For example, the notification relay application includes a function for relaying notification information generated from other applications of the electronic device (e.g., the SMS/MMS application, email application, health-care application, or environmental information application) to the external electronic device 102 or 104. The notification relay application receives notification information from, e.g., the external electronic device and provides the received notification information to the user.

The device management application performs at least some functions of the external electronic device communicating with the electronic device (for example, turning on/off the external electronic device (or some components of the external electronic device) or control of brightness (or resolution) of the display), and the device management application manages (e.g., install, delete, or update) an application operating in the external electronic device or a service (e.g., call service or message service) provided from the external electronic device.

The applications 370 include an application (e.g., a health-care application of a mobile medical device) designated according to an attribute of the external electronic device. The applications 370 include an application received from the external electronic device (e.g., the server 106 or electronic devices 102 and 104). The applications 370 include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 includes e.g., a module, program, routine, set of instructions, process, or the like for performing one or more functions.

Hereinafter, although a communication system including an IMS service network, as an example of the network, in this disclosure, examples of the network are not limited to the IMS service network, and it is apparent to one of ordinary skill in the art that embodiments of the present disclosure are applicable to communication systems including various networks.

Figure 4:
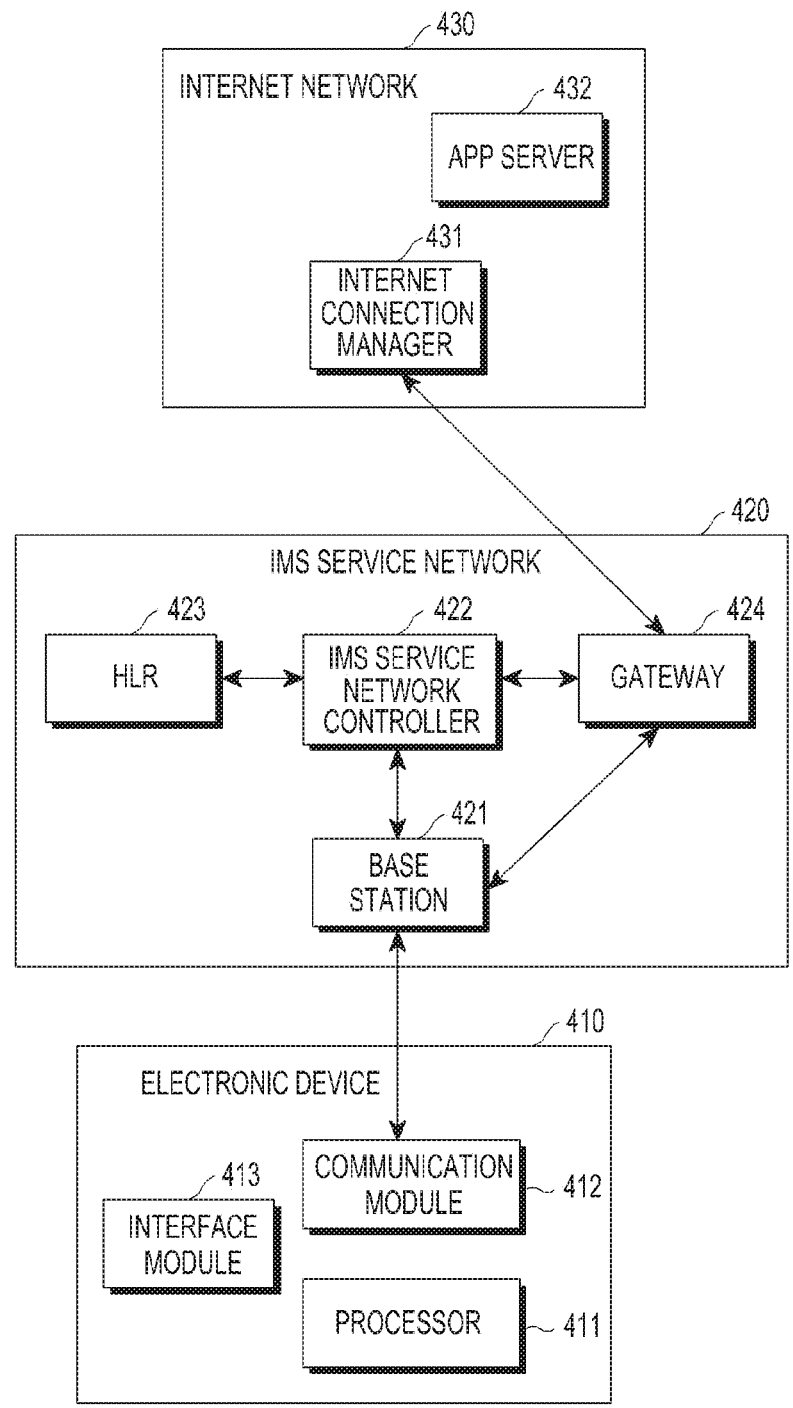
FIG. 4 is a block diagram illustrating an electronic device and a communication system including the electronic device according to an embodiment of the present disclosure.

FIG. 4 is a block diagram illustrating an electronic device (e.g., the electronic device 201) and a communication system including the electronic device according to an embodiment of the present disclosure.

The communication system includes an electronic device 410, an IMS service n (e.g., an LTE network) 420, and an Internet network 430.

The electronic device 410 may request access to the IMS service network 420. For example, upon requesting access to the IMS service network 420, the electronic device 410 may send a connection request to the IMS service network 420 as per a communication method according to an embodiment of the present disclosure.

The electronic device 410 includes at least one communication module (or modem) 412, a processor 411, and an interface module 413. The processor 411 may enable a connection request to be sent through the communication module 412 to the IMS service network 420, corresponding to the access request. For example, when the SIM card accesses the interface module 413, the processor 411 obtains subscriber identification information from the SIM card and includes the obtained subscriber identification information in a communication connection request, and sends the same through the communication module 412 to the IMS service network 420.

The IMS service network 420 includes a base station (evolved Node B or eNB) 421, an IMS service network controller (mobility management entity, MME) 422, a home location register (HLR) 423, and a gateway 424. The IMS service network 420 includes one or more base stations 421, one or more IMS service network controllers 422, one or more HLRs 423, and one or more gateways 424.

The base station 421 may function as a communication interface device providing connection between at least one electronic device 410 and the IMS service network 420. The base station 421 controls the bandwidth necessary for communication connection between the electronic device 410 and the IMS service network 420.

The IMS service network controller 422 controls the communication connection state between the IMS service network 420 and the electronic device 410 through the base station 41. For example, the IMS service network controller 422 receives a connection request from the electronic device 410 and performs an authentication procedure for the electronic device 410 corresponding to the received connection request.

Specifically, the IMS service network controller 422 may detect the subscriber identification information included in the connection request message received from the electronic device 410, determine whether the detected subscriber identification information is consistent with pre-registered subscriber information, and provide authentication on the electronic device 410 according to a result of the determination. The IMS service network controller 422 may obtain location information on the electronic device 410 connected with the IMS service network 420, store the obtained location information on the electronic device 410, and provide the electronic device 410 with connection to the Internet network 430 based on the obtained location information.

The HLR 423 manages subscriber identification information on one or more electronic devices (e.g., the electronic device 410) connected with the communication system 410, 420, and 430.

The gateway 424 includes a serving gateway (S-GW) and a public data network gateway (P-GW), and performs communication with the IMS service network 420 and an external service providing network (e.g., the Internet network 430). For example, the gateway 424 may route communication data packets exchanged while in communication connection with the electronic device 410 and the Internet network 430. The gateway 424 provides a security service (e.g., firewall service) while in communication connection with the electronic device 410 and the Internet network 430. The gateway 424 may assign IP to the electronic device 410, which is necessary for communication connection with the electronic device 410 and the Internet network 430.

The Internet network 430 includes an Internet connection manager (call session control function, CSCF) 431 and an application server (app server) 432.

The Internet network 430 may be an Internet network for the electronic device 410 to receive the IMS service. The Internet network provides the IMS service to the electronic device 410 based on the Internet protocol (IP), and based on the same, the Internet network provides the electronic device 410 with services providing multimedia data, such as voice data, video and audio data or other multimedia data to the electronic device 410 connected with the Internet network 430.

The Internet connection manager 431 includes at least one session control of a proxy call session control function (P-CSCF), a serving call session control function (S-CSCF), or an interrogating call session control function (I-CSCF). The Internet connection manager 431 may register the identification imbalance on the electronic device 410 in the Internet network 430, corresponding to the connection request received from the electronic device 410 via the IMS service network 420. The Internet connection manager 431 receives a call connection from the electronic device 410 and controls the received call connection.

The app server 432 stores and manages information necessary for service provided from the Internet network 430 to the electronic device 410. The app server 432 includes a telephony application server (TAS) or a voice call continuity (VCC) server. The TAS provides multimedia services to the electronic device 410 connected with the Internet network 430. For example, the TAS transmits display information or ringtone information on the caller's number to the electronic device 410. The VCC server provides seamless handover between different service providing networks (e.g., a CDMA network and an Internet network) to maintain the call connection state of the call-connected electronic device 410.

For example, when the electronic device 410 in a call connection relocates from a first service providing network to a second service providing network, the call maintaining server may change the base station connected with the electronic device from a first base station connecting the first service providing network with the electronic device to a second base station connecting the electronic device with the second service providing network while maintaining the call in order to maintain the call connected state of the electronic device 410.

The electronic device includes a communication module transmitting a first connection request message to the network for a service connection and receiving a connection reject message for the first connection request from the network and a controller abstaining from retransmission of the connection request to the network based on the first connection reject message, determining whether an operation configured in the electronic device belongs to a condition set by the electronic device based on at least a portion of the abstinence operation, and when belonging to the condition, controlling the communication module to transmit a second connection request message to the network.

The processor may further determine whether a first time obtained from the network elapses.

The controller receives, through the communication module, a second connection reject message for the transmitted second connection request message, compare a rejection reason for the received second connection reject message with a rejection reason for the received first connection reject message, and when the rejection reason for the second connection reject message is identical to the rejection reason for the first connection reject message, set a second time to be shorter than the first time.

The first and second connection request messages include subscriber identification information or access point name (APN) information.

The first connection reject message includes any one or more of the rejection reason that the APN requested by the electronic device is not supported or the rejection reason that the requested service is not in subscription.

Figure 5:
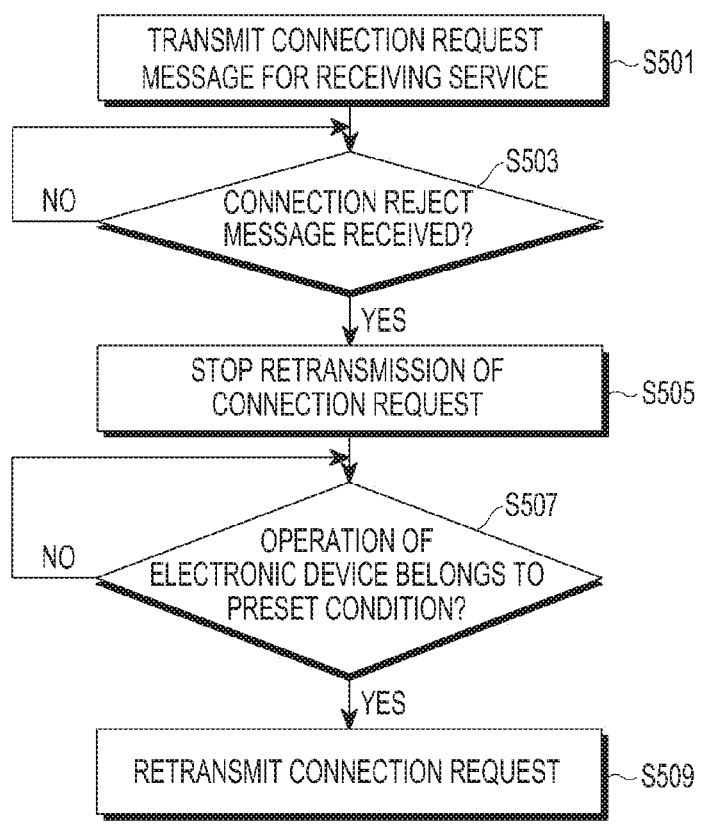
FIG. 5 illustrates a communication method according to an embodiment of the present disclosure.

FIG. 5 illustrates a communication method according to an embodiment of the present disclosure.

The electronic device 400 receives a request for connection to the IMS service network from the user or outside via the input/output interface 413 or communication module 412. According to an embodiment of the present disclosure, corresponding to the received connection request, the electronic device 400 may identify whether a SIM card is in connection with the electronic device 400. Upon identifying that the SIM card is in connection, the electronic device 400 may obtain subscriber identification information from the SIM card and generate a connection request message including the obtained subscriber identification information.

Referring to FIG. 5, in step S501, the processor 411 transmits connection request message (e.g., a packet data network (PDN) connectivity request) to the IMS service network 420 via the communication module 412 to receive a service.

The requested service may be an IMS service. The connection request message includes the subscriber identification information, which includes an international mobile equipment identity (IMEI), a globally unique temporary identifier (GUTI), and a temporary mobile subscriber identity (TMSI).

In step S503, the processor 411 determines whether a connect reject message (e.g., a PDN connectivity reject) is received from the IMS service network 420 via the communication module 412, corresponding to the pre-transmitted connection request message.

The connection reject message includes reject reason information on the rejection of connection. For example, the reject reason information includes the state in which the subscriber identification information is not registered in the IMS service network 420.

In step S505, when determining that the connection reject message is received, the processor 411 abstains from retransmission of the connection request retransmitted through the communication module 412. If the connection reject message is not received, the processor 411 repeats step S503.

In step S507, after abstaining from retransmission of connection request, the processor 411 determines whether an operation configured by the electronic device 410 belongs to a condition preset by the electronic device 410 based on at least a portion of the abstention operation.

In step S509, when belonging to the preset condition, the processor 411 may retransmit a connection request to the IMS service network 420. If it is determined that the operation does not belong to a preset condition, the processor 411 repeats step S507.

Figure 6:
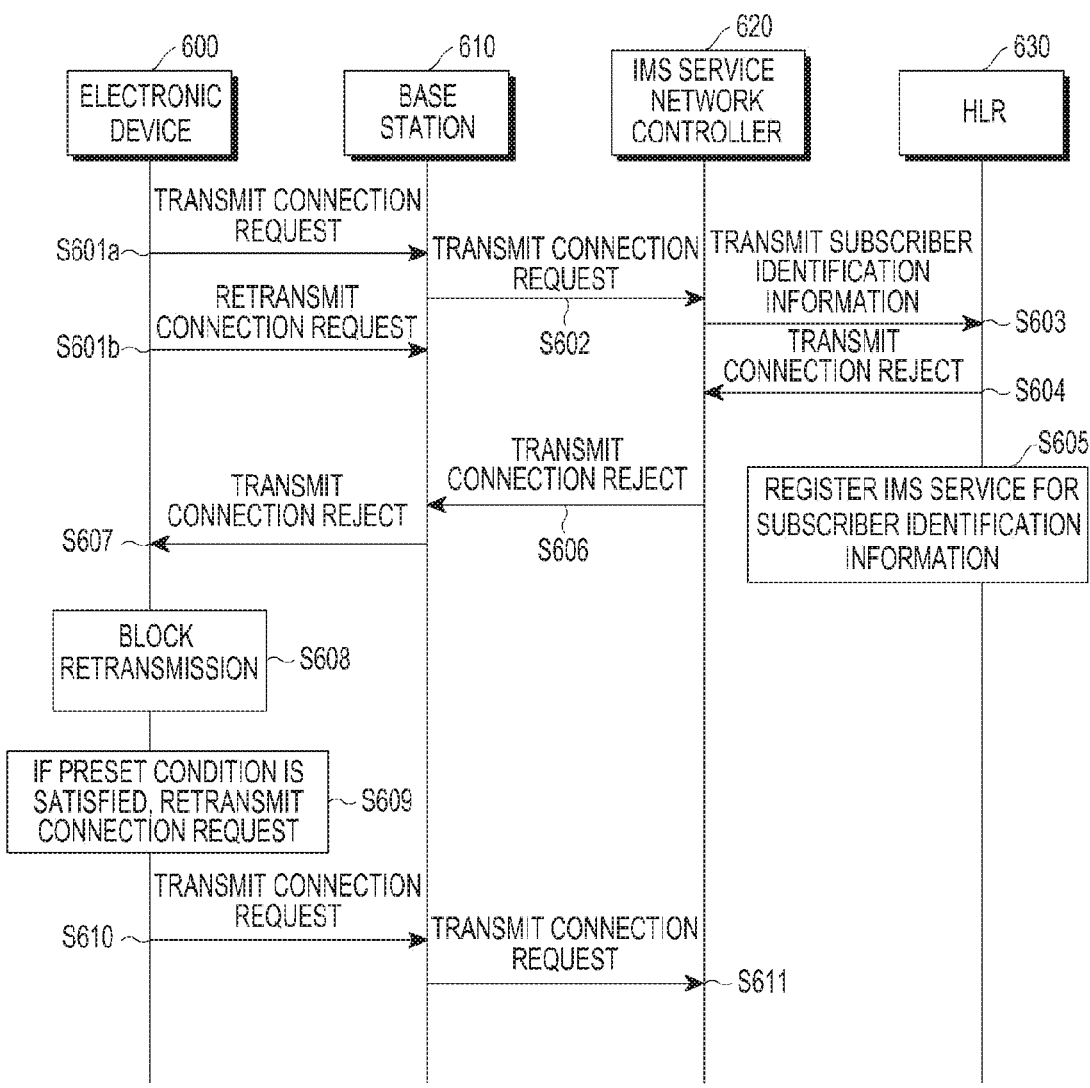
FIG. 6 illustrates a procedure for processing a service connection request according to an embodiment of the present disclosure.

FIG. 6 illustrates a procedure for processing a service connection request according to an embodiment of the present disclosure.

Referring to FIG. 6, in step S601a, the electronic device 600 transmits a connection request (e.g., a PDN connectivity request to the base station 610. The connection request may be a connection request message generated based on an access point name (APN). The APN includes information related to the IMS service. The connection request message includes subscriber identification information obtained from the SIM card connected to the electronic device 600. Alternatively, the connection request message includes identification information generated based on the subscriber identification information.

In step S602, upon reception of the connection request, the base station 610 transmits the received connection request to the IMS service network controller 620.

In step S603, upon reception of the connection request, the IMS service network controller 620 obtains the subscriber identification information and transmits the obtained subscriber identification information to the HLR 630. When the subscriber identification information is transmitted, the IMS service network controller 620 requests the HLR 630 to determine whether the subscriber identification information is in registration to use the corresponding service (e.g., the IMS service). When the subscriber identification information is transmitted, the HLR 630 determines whether the transmitted subscriber identification information is in registration in the service.

In step S604, when determining that the transmitted subscriber identification information is not in registration, the HLR 630 transmits a connection reject message to the IMS service network controller 620.

In step S605, the HLR 630 may register the subscriber identification information determined not to be in registration in the service providing network (IMS network) having received the connection request from the electronic device 600, corresponding to the result of determination.

In step S606, the IMS service network controller 620 transmits the received connection reject message to the base station 610. The base station 610 transmits the transmitted connection reject message to the electronic device 600. The IMS service network controller 620 transmits a connection reject message including information indicating that the subscriber identification information is not registered in the service providing network to the electronic device 600. Alternatively, the IMS service network controller 620 transmits a connection reject message including information indicating that the subscriber identification information does not support the requested APN to the electronic device 600.

In step S608, upon reception of the connection reject message including a particular reject reason, the electronic device 600 abstains from retransmission of the connection request. After abstaining from retransmission, the electronic device 600 determines whether to belong to a preset condition previously set by the electronic device.

The preset condition includes when the bandwidth of a signal received by the electronic device 600 changes to a bandwidth corresponding to the access network, when the state of the electronic device 600 changes from impossible to communicate data to possible, when the state of the electronic device 600 changes from abstaining from data communication to open, when the electronic device 600 moves from a region where data transmission to the access network is impossible to another region where the data transmission is possible, when the connection mode of the electronic device 600 changes from a circuit-switched fallback (CSFB) connection mode to an access network connection mode, or when a call-related operation is performed by the electronic device.

In step S609, upon determination that the operation of the electronic device 600 belongs to the preset condition, the electronic device 600 may resume the retransmission of connection request having abstained from retransmission and transmits the connection request to the base station 610.

In step S611, the base station 610 transmits the received connection request to the IMS service network controller 620.

Figure 7:
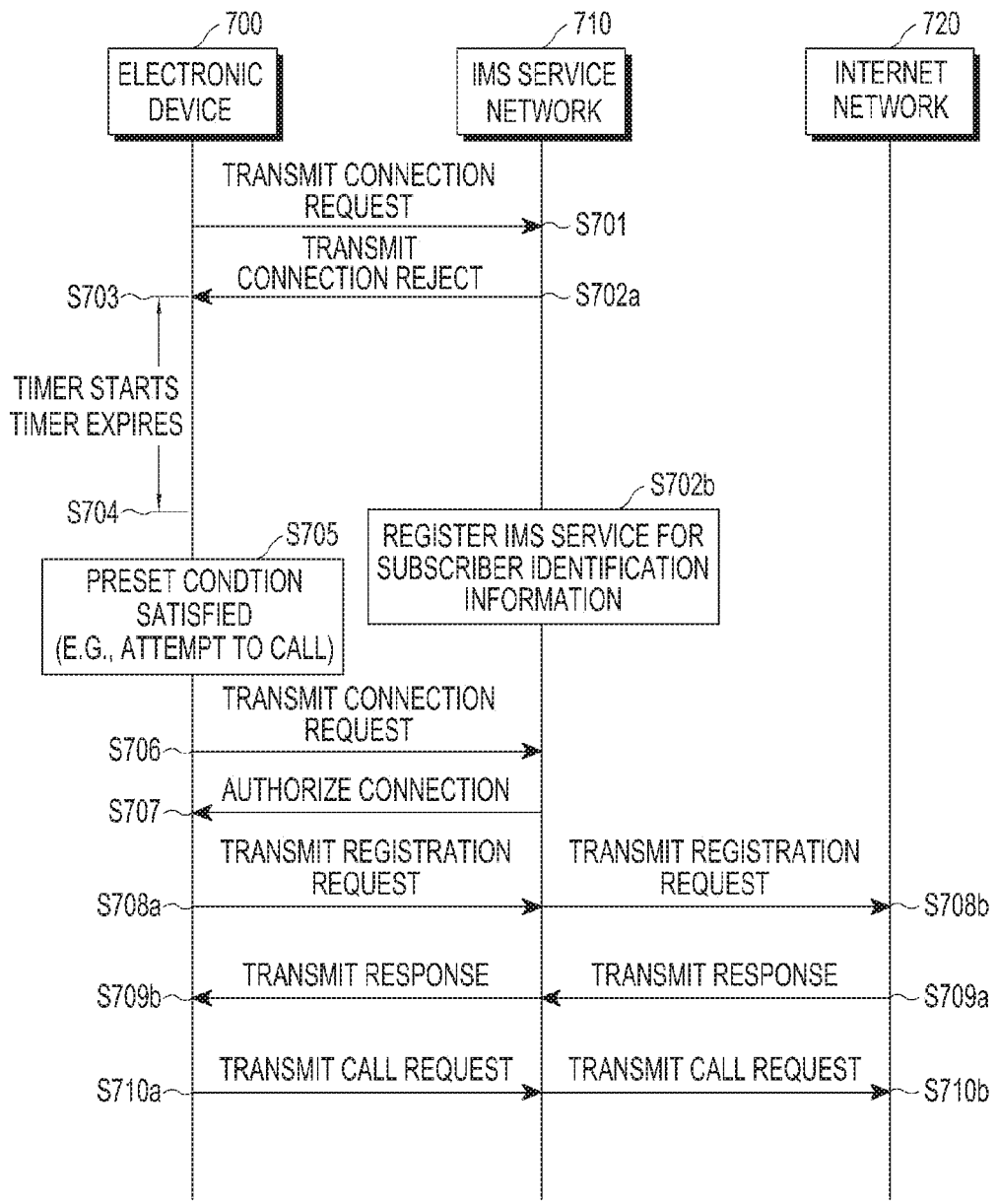
FIG. 7 illustrates a communication method according to an embodiment of the present disclosure.

FIG. 7 illustrates a communication method according to an embodiment of the present disclosure.

Referring to FIG. 7, in step S601, the electronic device 700 transmits a connection request to the IMS service network 710.

In step S702a, when the connection request is transmitted, the IMS service network 710 determines whether the subscriber identification information included in the connection request is in registration in the requested service (e.g., the IMS service), and when determining that the subscriber identification information is not in registration, the IMS service network 710 transmits a connection reject message to the electronic device 700. The electronic device 700 receives the connection reject message.

In step S702b, the IMS service network 710 performs registration so that the requested service for the subscriber identification information may be used.

In step S703, upon reception of the connection reject message, the electronic device 700 abstains from retransmission of connection request corresponding to the connection reject and may initiate a timer configured by the electronic device 700 or obtained from the IMS service network 710.

In step S704, after the timer starts, the electronic device 700 determines whether the started timer expires.

The time of the timer may be varied based on the reason for rejection of connection received before abstinence from retransmission of connection request. For example, when the first connection reject message including a first rejection reason is received in response to the first connection request message, after abstaining from retransmission of the connection request message corresponding to the received first connection reject message, the first time of the first timer elapses, a second connection request is transmitted according to whether to belong to a preset condition, and a second connection rejection reason included in the second connection request message responsive to the second connection request differs from the first connection rejection reasons, the electronic device 700 may apply a second time that is identical to the first time of the first timer to initiate and terminate the timer. Meanwhile, when the second connection request is identical to the first connection rejection reason, the electronic device 700 may apply a second time to be shorter than the first time of the first timer to initiate and terminate the timer.

In step S705, when determining that the timer terminates, the electronic device 700 determines whether to belong to the preset condition.

In step S706, when determining to belong to the preset condition (e.g., input of attempt of call connection to the electronic device), the electronic device 700 may retransmit the connection request to the IMS service network 710.

In step S707, when the connection request is received, the IMS service network 710 determines whether the subscriber identification information included in the connection request is previously registered, and when determining that the subscriber identification information is previously registered, the IMS service network 710 transmits a connection authenticate message to the electronic device 700.

In step S708a, when the connection authenticate message is transmitted, the electronic device 700 transmits a service registration request message for the Internet network 720 to the IMS service network 710.

In step S708b, the IMS service network 710 transmits the pre-received registration request to the Internet network 720 via the gateway 424 of the IMS service network 710.

In step S709a, the Internet network 720 transmits a response message to the IMS service network 710, and in step S709b, the IMS service network 710 transmits the received response message to the electronic device 700, which receives the response message. The response message includes information indicating that the registration has been done corresponding to the received registration request. The response message includes address information (IP information) assigned to the electronic device 700 by the Internet network 720.

In step S710a, the electronic device 700 transmits a call request to the IMS service network 710 corresponding to the received response message, and in step S710b, the IMS service network 710 transmits the transmitted call request to the Internet network 710b.

Figure 8:
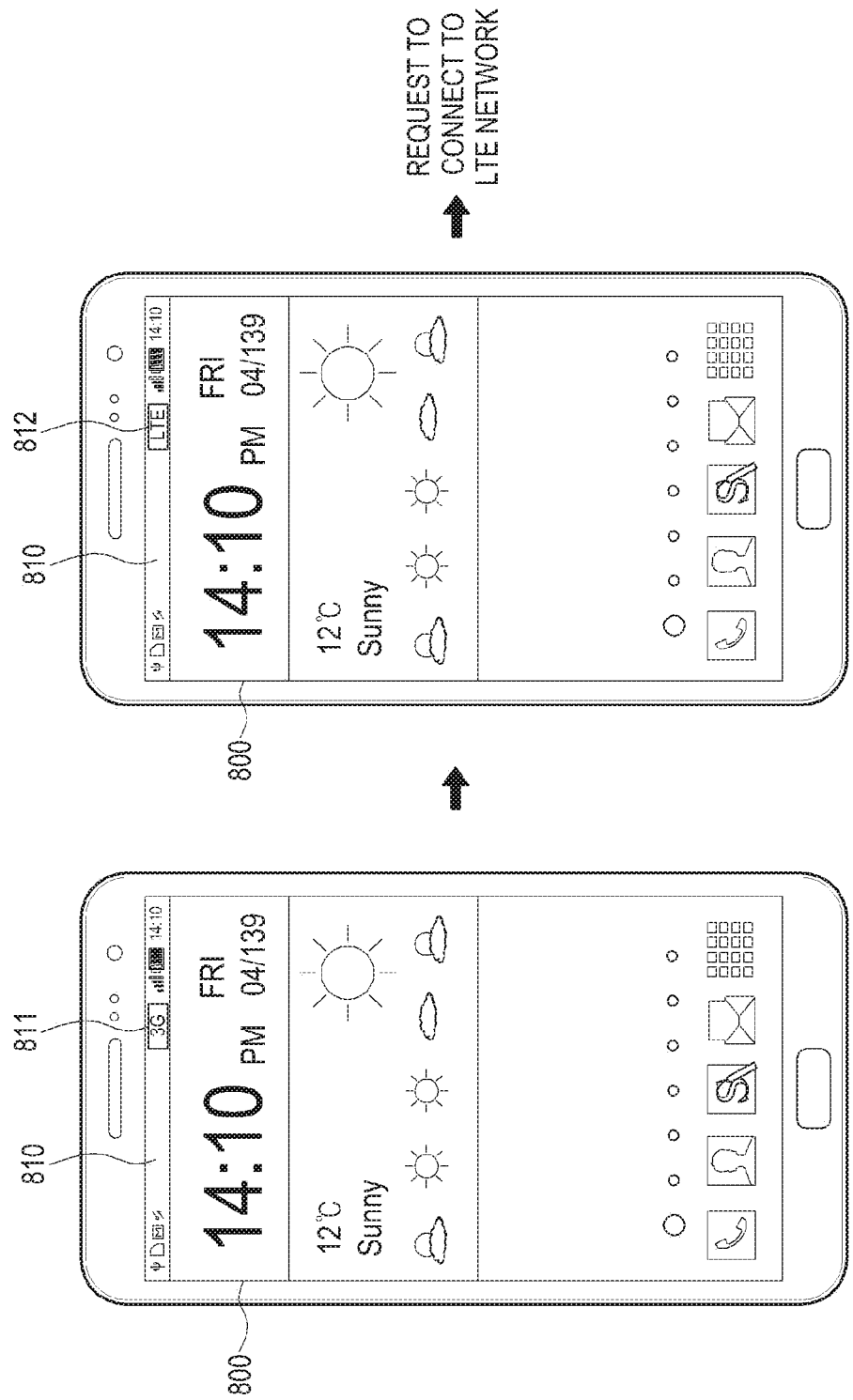
FIG. 8 illustrates an example of a method for requesting a service connection according to an embodiment of the present disclosure.

FIG. 8 illustrates an example of a method for requesting a service connection according to an embodiment of the present disclosure.

Referring to FIG. 8, the electronic device 800 displays a state display bar 810. The state display bar 810 includes bandwidth information 811 and 812 for communicable data networks of the electronic device 800.

The electronic device 800 transmits a first connection request message for service connection to the network (e.g., the IMS service network 710) and receives a first connection reject message for the first connection request message from the network (the IMS service network 710). The electronic device 800 abstains from retransmission of the connection request message to the network (IMS service network 710) based on the first connection reject message.

When the operation of changing the bandwidth information on the data network of the electronic device 800 from first bandwidth information 811 indicating that 3rd generation (3G) communication is possible to second bandwidth information 812 indicating that LTE communication is possible is set by the electronic device 800, the electronic device 800 determines whether the operation of changing the bandwidth information for the data network from the first bandwidth information 811 to the second bandwidth information 812 belongs to a designated, preset condition based on at least a portion of the abstinence operation.

According to an embodiment of the present disclosure, when determining that the operation of changing the bandwidth information for the data network from the first bandwidth information 811 indicating that 3G communication is possible to the second bandwidth information 812 indicating that LTE communication is possible belongs to the designated, preset condition by the electronic device 800, the electronic device 800 transmits a second connection request message to the network (IMS service network 710).

Figure 9:
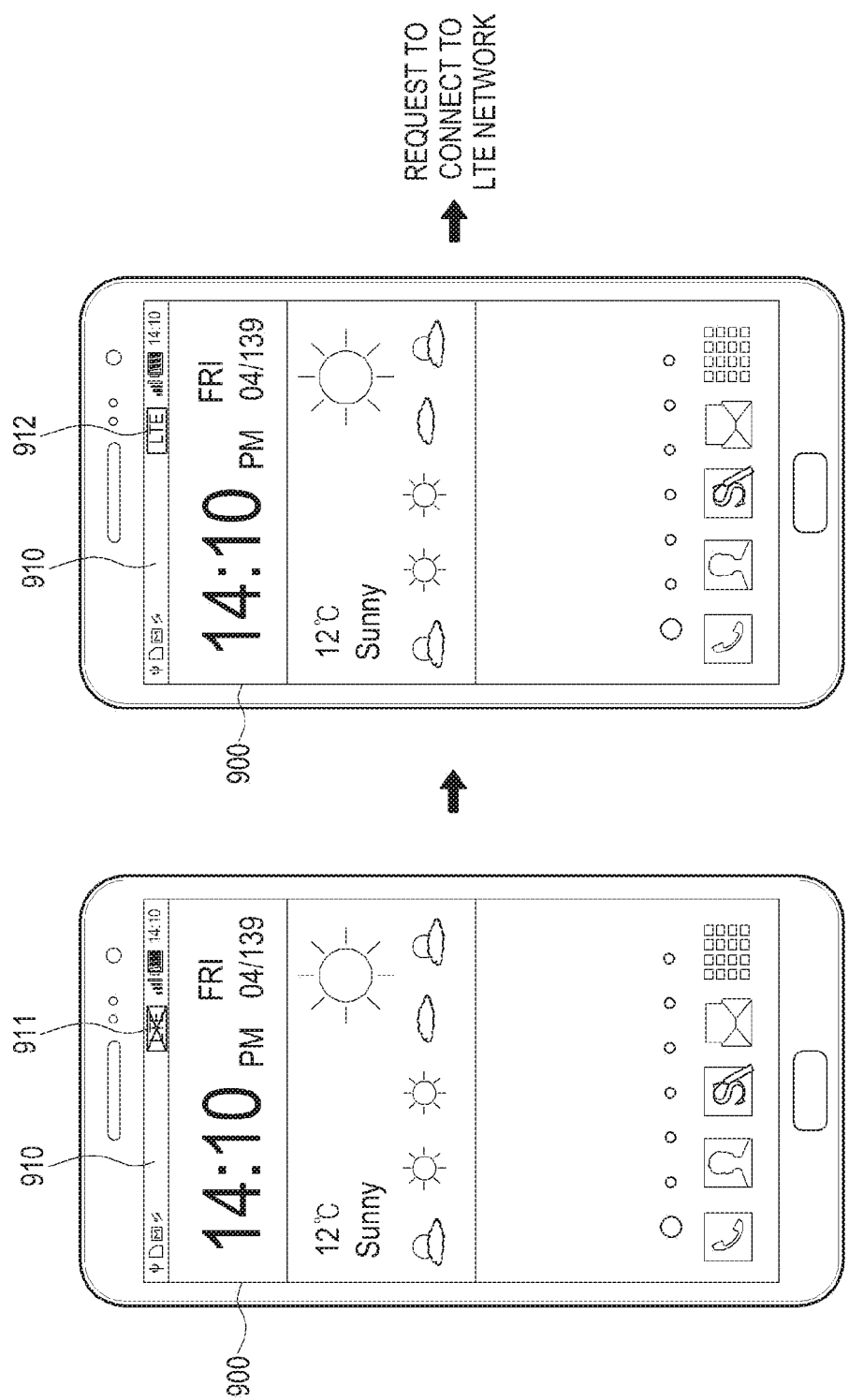
FIG. 9 illustrates another example of a connection request method according to an embodiment of the present disclosure.

FIG. 9 illustrates another example of a connection request method according to an embodiment of the present disclosure. The state display bar 910 includes information 911 and 912 indicating whether the electronic device 900 performs data network communication.

The electronic device 900 abstains from retransmission of the connection request message to the network (IMS service network 710) based on the first connection reject message.

When the operation of changing data network communication possible/impossible information is possible by the electronic device 900 from first possible/impossible information 911 indicating that the data network communication is impossible to second possible/impossible information 912 indicating that the data communication is possible is set by the electronic device 900, the electronic device 900 determines whether the operation of changing the data network communication possible/impossible information from the first possible/impossible information 911 to the second possible/impossible information 912 belongs to a designated, preset condition by the electronic device based on at least a portion of the abstinence operation.

According to an embodiment of the present disclosure, when determining that the operation of changing the data network communication possible/impossible information from the first possible/impossible information 911 to the second possible/impossible information 912 belongs to a designated, preset condition by the electronic device 900, the electronic device 900 transmits a second connection request message to the network (IMS service network 710).

Figure 10:
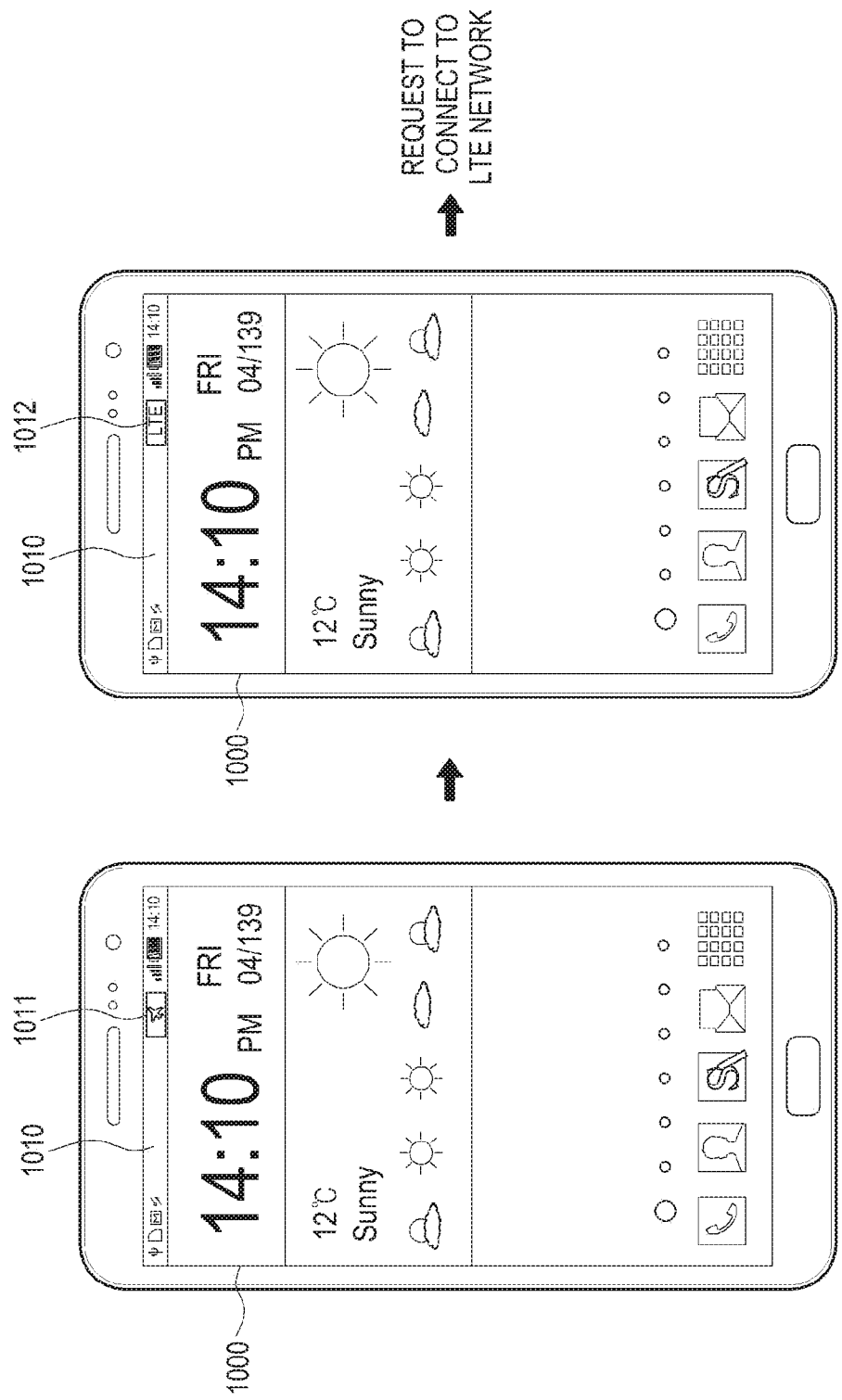
FIG. 10 illustrates another example of a connection request method according to an embodiment of the present disclosure.

FIG. 10 illustrates another example of a connection request method according to an embodiment of the present disclosure. The state display bar 1010 includes information 1011 and 1012 indicating whether the electronic device 1000 may block data network communication. The electronic device 1000 abstains from retransmission of the connection request message to the network (IMS service network 710) based on the first connection reject message.

When the operation of changing data network communication block or unblocked information of the electronic device 1000 from first block or unblocked information 1011 (e.g., an airplane mode) indicating that the data network communication is blocked to second block or unblocked information 1012 indicating that the blocking of data communication is released is set by the electronic device 1000, the electronic device 1000 determines whether the operation of changing the data network communication block or unblocked information from the first block or unblocked information 1011 to the second block or unblocked information 1012 belongs to a designated, preset condition by the electronic device based on at least a portion of the abstinence operation.

According to an embodiment of the present disclosure, when determining that the operation of changing the data network communication block or unblocked information from the first block or unblocked information 1011 to the second block or unblocked information 1012 belongs to a designated, preset condition by the electronic device 1000, the electronic device 1000 transmits a second connection request message to the network (IMS service network 710).

Figure 11:
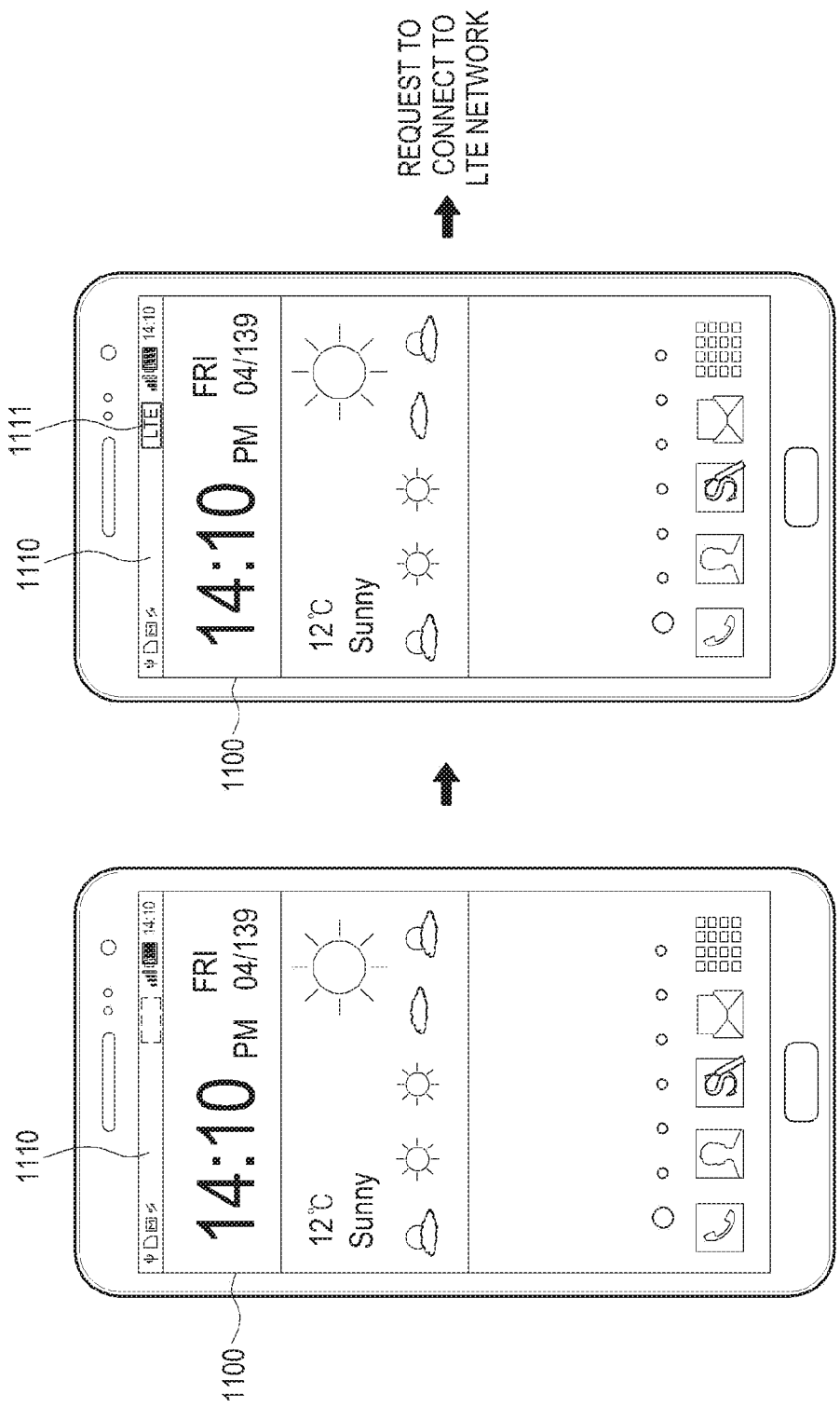
FIG. 11 illustrates another example of a connection request method according to an embodiment of the present disclosure.

FIG. 11 illustrates another example of a connection request method according to an embodiment of the present disclosure. The state display bar 1110 includes information 1111 and 1112 indicating regions where the electronic device 1100 performs data network communication.

The electronic device 1100 abstains from retransmission of the connection request message to the network (IMS service network 710) based on the first connection reject message. When the operation of changing data network communication region information of the electronic device 1100 from first region information 1111 indicating a region where the data network communication is impossible to second region information 1112 indicating a region where the data communication is possible is set by the electronic device 1100, the electronic device 1100 determines whether the operation of changing the data network communication region information from the first region information 1111 to the second region information 1112 belongs to a designated, preset condition by the electronic device 1110 based on at least a portion of the abstinence operation.

According to an embodiment of the present disclosure, when determining that the operation of changing the data network communication region information from the first region information 1111 to the second region information 1112 belongs to the designated, preset condition by the electronic device 1100, the electronic device 1100 transmits a second connection request message to the network (IMS service network 710).

Figure 12:
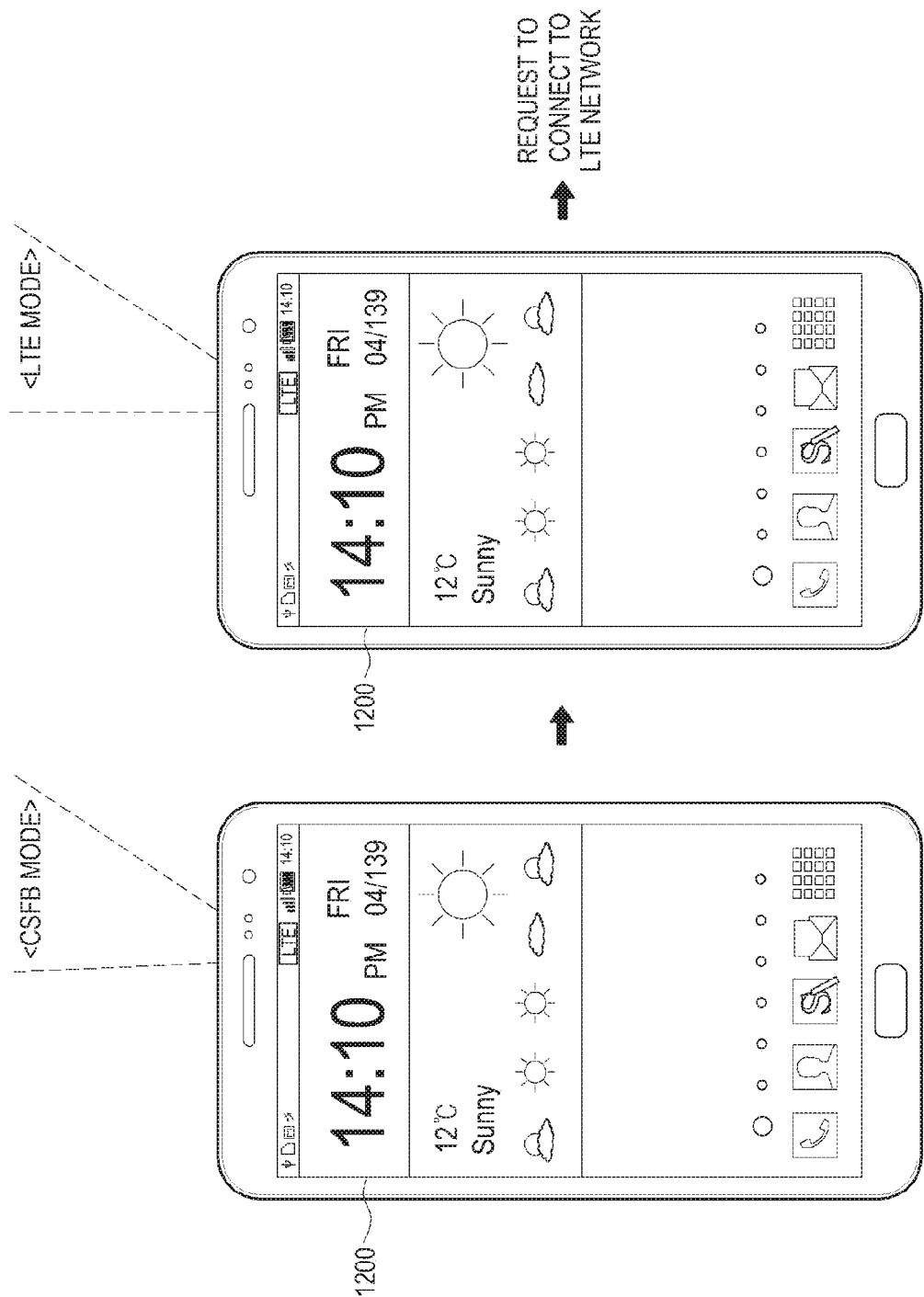
FIG. 12 illustrates another example of a connection request method according to an embodiment of the present disclosure.

FIG. 12 illustrates another example of a connection request method according to an embodiment of the present disclosure. The electronic device 1200 may access the data network service in a circuit-switched fallback (CSFB) connection mode or network connection mode.

The electronic device 1200 abstains from retransmission of the connection request message to the network (IMS service network 710) based on the first connection reject message. When the operation of changing the data network service access mode of the electronic device 1200 from the CSFB connection mode to the network connection mode is set by the electronic device 1200, the electronic device 1200 determines whether the operation of changing the data network service access mode from the CSFB connection mode to the network connection mode belongs to a designated, preset condition by the electronic device 1200 based on at least a portion of the abstinence operation. According to an embodiment of the present disclosure, when determining that the operation of changing the data network service access mode from the CSFB connection mode to the network connection mode belongs to the designated, preset condition by the electronic device 1200, the electronic device 1200 transmits a second connection request message to the network (IMS service network 710).

Figure 13:
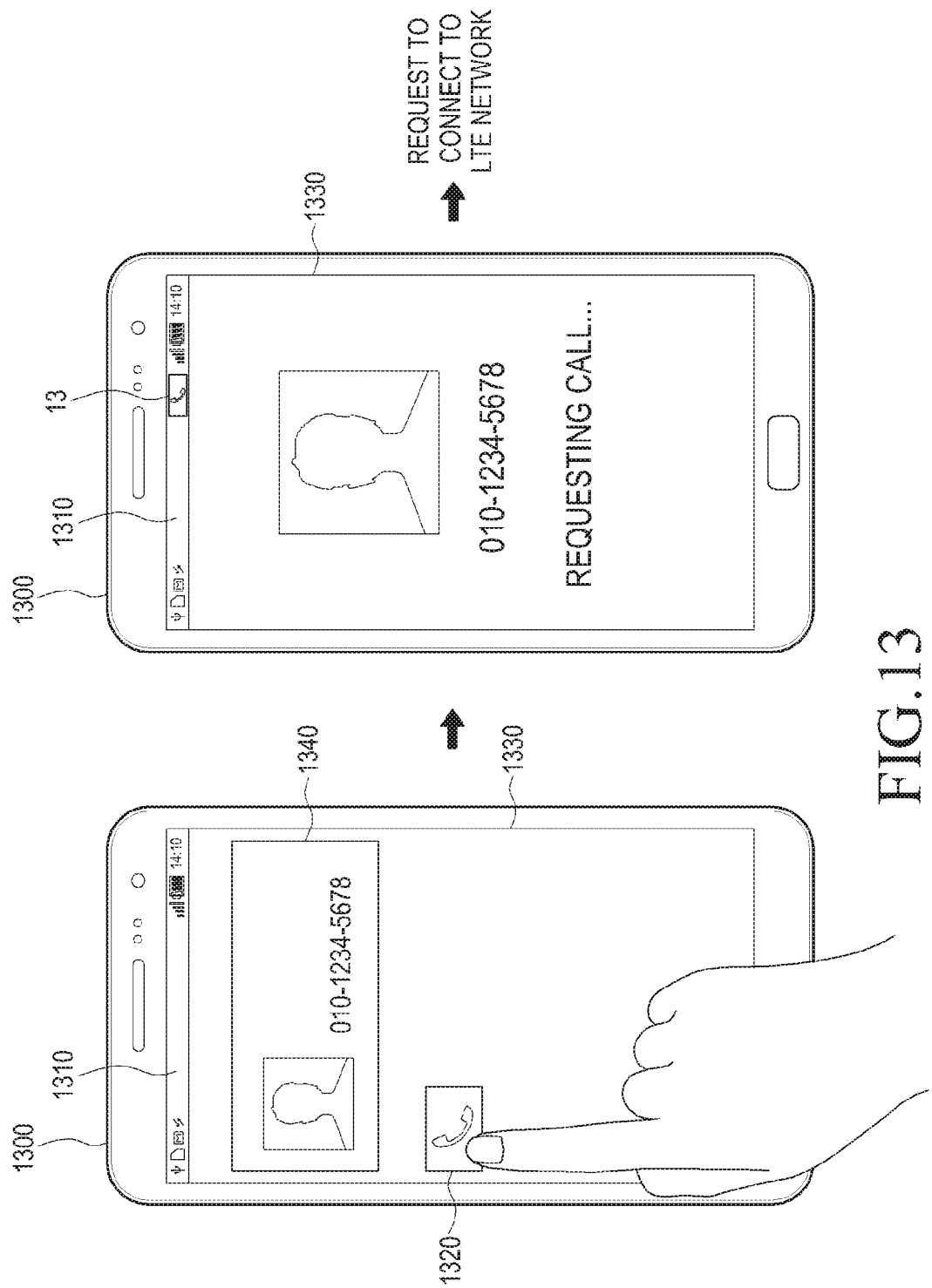
FIG. 13 illustrates another example of a connection request method according to an embodiment of the present disclosure.

FIG. 13 illustrates another example of a connection request method according to an embodiment of the present disclosure.

The electronic device 1300 abstains from retransmission of the connection request message to the network (IMS service network 710) based on the first connection reject message.

The electronic device 1300 displays a call connection tab 1320 for receiving a first contact 1340 and a command for calling at the first contact 1340 through the touchscreen 1330. Upon reception of an input to the call connection tab 1320 from the user, the electronic device 1300 may send a request for call connection to the first contact 1340 to the network (IMS service network 710).

When a call connection request operation for the first contact 1340 is set by the electronic device 1300, the electronic device 1300 determines whether the call connection request operation belongs to a designated, preset condition by the electronic device 1300 based on at least a portion of the abstinence operation. According to an embodiment of the present disclosure, when determining that the call connection request operation belongs to the designated, preset condition by the electronic device 1300, the electronic device 1200 transmits a second connection request message to the network (IMS service network 710).

According to an embodiment of the present disclosure, a method for performing communication by an electronic device includes transmitting a first connection request message to a network for a service connection by the electronic device, receiving a connection reject message for the first connection request from the network, abstaining from retransmission of the connection request to the network based on the first connection reject message, determining whether an operation configured in the electronic device belongs to a condition set by the electronic device based on at least a portion of the abstinence operation, and when belonging to the condition, and when belonging to the preset condition, transmitting a second connection request message to the network.

Determining whether to belong to the preset condition by the electronic device may further include determining whether a first time obtained from the network elapses.

The method may further include receiving a second connection reject message for the transmitted second connection request message, comparing a rejection reason for the received second connection reject message with a rejection reason for the received first connection reject message, and when the rejection reason for the second connection reject message is identical to the rejection reason for the first connection reject message, setting a second time to be shorter than the first time.

The first and second connection request messages include subscriber identification information or APN information.

The subscriber identification information includes at least one of an IMEI, a GUTI, and a TMSI.

The APN includes an APN related to an IMS.

The first connection reject message includes any one or more of the rejection reason that the APN requested by the electronic device is not supported or the rejection reason that the requested service is not in subscription.

The condition set by the electronic device includes when the bandwidth of a signal received by the electronic device changes to a bandwidth corresponding to the network.

The condition set by the electronic device includes when a state of data communication of the electronic device changes from impossible to possible.

The condition set by the electronic device includes when a state of data communication of the electronic device changes from blocked to unblocked.

The condition set by the electronic device includes when the electronic device relocates from an area where data transmission to the network is impossible to an area where the data transmission is possible.

The condition set by the electronic device includes when a connection mode of the electronic device changes from a CSFB connection mode to the network connection mode.

The condition set by the electronic device includes when an operation related to a call is performed by the electronic device.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module includes at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium includes a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, Flash Memories, and/or the like. Examples of the program instructions include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with embodiments of the present disclosure include at least one or more of the aforementioned components, omit some of them, or further include other additional components. Operations performed by modules, programming modules or other components in accordance with embodiments of the present disclosure may be performed sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or embodiments based on the technical spirit of the present disclosure.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method for performing communication by an electronic device, the method comprising:
    transmitting, by the electronic device, a first connection request message for a service connection to an external device;
    receiving a first connection reject message based on the first connection request message, when the electronic device is not registered for the service connection;
    abstaining, by the electronic device, from retransmission of a second connection request message to the external device based on the connection reject message until a first time elapses, wherein the first time elapsing is related to a state in which the service connection is available;
    performing, when the first time elapses, the retransmission of the second connection request message to the external device;
    receiving a second connection reject message based on the retransmission of the second connection request message, when the electronic device is not registered for the service connection;
    comparing a first rejection reason for the first connection reject message with a second rejection reason for the second connection reject message;
    based on identifying the first rejection reason for the second connection reject message being identical to the second rejection reason for the second connection reject message, setting a second time to be less than the first time that elapsed before,
    performing, when the second time set to be less than the first time that elapsed before, retransmission of a third connection request message to the external device; and
    communicating with the external device based on the retransmission of the third connection request message when the electronic device is registered for the service connection based on the second connection request message;
    wherein the first connection request message includes at least one of subscriber identification information or access point name (APN) information.

2. The method of claim 1, wherein the subscriber identification information includes at least one of an international mobile equipment identity, a globally unique temporary identifier, and a temporary mobile subscriber identity.

3. The method of claim 1, wherein the APN information relates to an IP multimedia subsystem (IMS).

4. The method of claim 1, wherein the first connection reject message includes at least one of a first rejection reason that the APN information requested by the electronic device is not supported and a second rejection reason that the service connection is not available.

5. The method of claim 1, further comprising:
    identifying that the first time elapses in response to identifying a bandwidth of a signal which is received by the electronic device being changed so that the service connection is available.

6. The method of claim 1, further comprising:
    identifying that the first time elapses in response to identifying that a data communication of the electronic device for the service connection is changed to be available.

7. The method of claim 1, further comprising:
    identifying that the first time elapses in response to identifying a state of data communication of the electronic device for the service connection being changed from blocked to unblocked.

8. The method of claim 1, further comprising:
identifying that first time elapses in response to identifying the electronic device relocating from an area where data transmission for the service connection to the external device is impossible to an area where the data transmission for the service connection is possible.

9. The method of claim 1, further comprising:
identifying that first time elapses in response to identifying a connection mode of the electronic device being changed from a circuit-switched fallback connection mode to an external device connection mode for the service connection.

10. The method of claim 1, wherein
communicating with the external device comprises communicating with the external device based on the retransmission of the second connection request message when electronic device is registered for the service connection.

11. The method of claim 1, further comprising:
identifying that the first time elapses in response to identifying that a call-related operation for the service connection is performed by the electronic device.

12. An electronic device comprising:
a communication module; and
a processor is configured to:
control the communication module to transmit a first connection request message for a service connection to an external device,
control the communication module to receive, from the external device, a first connection reject message for the first connection request message, in response to the first connection request message, when the electronic device is not registered for the service connection,
control the communication module to abstain from retransmission of a second connection request message to the external device based on the connection reject message until a first time elapses, wherein the first time elapsing is related to a state in which the service connection is available,
when the first time elapses, control the communication module to perform the retransmission of the second connection request message to the external device,
control the communication module to receive a second connection reject message based on the retransmission of the second connection request message when the electronic device is not registered for the service connection,
compare a first rejection reason for the first connection reject message with a second rejection reason for the second connection reject message, and
based on identifying the first rejection reason for the first connection reject message being identical to the second rejection reason for the second connection reject message, set a second time to be less than the first time that elapsed before,
control the communication module to perform, when the second time set to be less than the first time that elapsed before, a retransmission of a third connection request message to the external device, and
control the communication module to communicate with the external device based on the retransmission of the second connection request message, when the electronic device is registered for the service connection based on the second connection request message;
wherein the first connection request message includes at least one of subscriber identification information or access point name (APN) information.

13. The electronic device of claim 12, wherein the first connection reject message includes at least one of a first rejection reason that the APN information requested by the electronic device is not supported and a second rejection reason that the service connection is not available.

14. The electronic device of claim 12, wherein the processor is further configured to:
identify that the first time elapses in response to identifying that a call-related operation for the service connection is performed by the electronic device.

* * * * *